(12) United States Patent
Teferi (10) Patent No.: US 11,847,079 B2
(45) Date of Patent: Dec. 19, 2023

(54) DYNAMIC ADDRESSING SYSTEM AND METHOD IN A DIGITAL COMMUNICATION INTERFACE

(71) Applicant: STMICROELECTRONICS S.r.l., Agrate Brianza (IT)

(72) Inventor: Eyuel Zewdu Teferi, Milan (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 0 days.

(21) Appl. No.: 17/714,733

(22) Filed: Apr. 6, 2022

(65) Prior Publication Data

US 2022/0327077 A1    Oct. 13, 2022

(30) Foreign Application Priority Data

Apr. 12, 2021    (IT) .................. 102021000009119

(51) Int. Cl.
  G06F 13/37    (2006.01)
  G06F 9/32     (2018.01)
  G06F 13/42    (2006.01)

(52) U.S. Cl.
  CPC .............. *G06F 13/37* (2013.01); *G06F 9/321* (2013.01); *G06F 13/4282* (2013.01)

(58) Field of Classification Search
  CPC ....... G06F 13/4282; G06F 9/321; G06F 13/37
  See application file for complete search history.

(56) References Cited

U.S. PATENT DOCUMENTS

| | | | |
|---|---|---|---|
| 7,653,757 B1 | 1/2010 | Fernald et al. | |
| 7,685,320 B1 | 3/2010 | Wishneusky | |
| 7,711,867 B2 | 5/2010 | Deshpande et al. | |
| 7,793,005 B1 | 9/2010 | Fernald et al. | |
| 8,040,215 B2 | 10/2011 | Zakriti | |
| 8,239,597 B2 | 8/2012 | Wishneusky | |
| 8,489,786 B2 | 7/2013 | Radhakrishnan et al. | |
| 8,892,798 B2 | 11/2014 | Tailliet et al. | |

(Continued)

OTHER PUBLICATIONS

Mipi Alliance, "Specification for I3C Basic," Version 1.0—Jul. 19, 2018, 172 pages.

(Continued)

*Primary Examiner* — Phong H Dang (74) *Attorney, Agent, or Firm* — SEED INTELLECTUAL PROPERTY LAW GROUP LLP (57) ABSTRACT

In a digital communication system, a master device and a number of slave devices are coupled in communication with the master device over a shared data communication bus. During an address assignment procedure, the master device assigns different respective dynamic addresses to the slave devices in order to address the slave devices for data communication; during the address assignment procedure, the slave devices are arranged in a daisy-chain configuration, wherein each slave device has a daisy-chain input and a daisy-chain output, the daisy-chain input of a slave device being coupled to the daisy-chain output of a previous slave device in the daisy chain configuration, the daisy-chain input of a first slave device being coupled to a daisy-chain enabling output of the master device; in particular, the master device is configured to assign the respective dynamic addresses to the slave devices based on their arrangement in the daisy-chain configuration.

23 Claims, 9 Drawing Sheets

(56) References Cited

U.S. PATENT DOCUMENTS

| | | | |
|---|---|---|---|
| 9,007,951 B2 | 4/2015 | Reidl et al. | |
| 9,152,598 B2 | 10/2015 | Fosse et al. | |
| 9,477,634 B2 | 10/2016 | Bell et al. | |
| 10,135,634 B2 | 11/2018 | Scherr | |
| 10,204,066 B2 | 2/2019 | Miluzzi et al. | |
| 10,459,862 B2 | 10/2019 | Miluzzi et al. | |
| 11,321,269 B1* | 5/2022 | Mandiram | H03K 3/037 |
| 2012/0243559 A1* | 9/2012 | Pan | H04J 3/1605 |
| | | | 370/503 |
| 2018/0013578 A1* | 1/2018 | Gozloo | G06F 3/0655 |
| 2020/0133904 A1* | 4/2020 | Takahashi | G06F 13/4291 |
| 2020/0159689 A1* | 5/2020 | Koshisaka | G06F 13/4291 |

OTHER PUBLICATIONS

Asahi Kasei Microdevices Corporation, "AK5703: 4-Channel 24-bit ADC with PLL & MIC-AMP," Data Sheet, May 2013, 76 pages.
Cañete et al., "Sensors Systems for Smartphones, Tablets and IoT: New Advanced Design Approach," *Sensors & Transducers 187*(4): 1-9, 2015.
Linear Technology, "LTC2451: Ultra-Tiny, 16-bit DS ADC with I$^2$C Interface," Data Sheet, LT 0610 Revision F, Linear Technology Corporation 2008, 18 pages.
5 NXP Semiconductors, "UM10204: I$^2$C-bus specification and user manual," User Manual, Revision 6, Apr. 4, 2014, 64 pages.
Panasonic, "AN12978A: Monaural BTL amplifier IC with built-in AGC (I$^2$C-bus-control correspondence)," Data Sheet, Oct. 2008, 21 pages.

\* cited by examiner

DYNAMIC ADDRESSING SYSTEM AND METHOD IN A DIGITAL COMMUNICATION INTERFACE

BACKGROUND

Technical Field

The present disclosure relates to a dynamic addressing system and method in a digital communication interface, in particular in a serial interface, more in particular operating according to the I3C (Improved Inter Integrated Circuit) protocol defined by the MIPI (Mobile Industry Processor Interface) alliance.

Description of the Related Art

Digital communication interfaces are commonly used, for example in embedded systems, to implement digital communication between at least one master or host device (e.g., a digital processor or controller) and a number of slave devices (e.g., sensor devices) coupled to a same digital communication bus or line and which may individually be addressed by the master device.

Each slave device has to be provided with a unique address, to allow the master device to properly address data communication towards the same slave device.

In particular, in a known solution, the master device is configured to assign unique addresses to each slave device during an address-assignment initialization step, preliminary to data communication.

Issues may occur when multiple identical slave devices are coupled to the same communication bus (e.g., a I3C bus); in this case, it is indeed difficult to differentiate the various slave devices during initialization to allow the master device to assign the respective unique addresses.

For example, multiple identical slave devices may be identical sensor devices (i.e., sensors of a same type and manufacturer), which are all coupled to the same communication bus, being redundant sensors or sensors specialized for different functions. Usually, these sensors will have a same static address, so that solutions have to be provided allowing them to be distinguished by the master device.

In a possible known solution, GPIO (General Purpose Input Output) pins, dedicated to each of the slave devices, are used to differentiate their static address. This is a simple but costly solution in terms of GPIO pins and PCB traces and it is not scalable, the more slave devices are present the more GPIO pins being required. As an example, slave devices in a communication bus according to the I2C protocol can have a same static address and up to 128 variations of that static address based on the availability of GPIO pins dedicated per device.

According to another known solution, One Time Programmable (OTP) address variation bits are used to define address variations for the various slave devices, during the design or manufacturing stage. This solution allows to define some address variations, but entails a relevant cost due to the dedicated address variation bits and dedicated programming required for each slave device.

The I3C protocol provides a Dynamic Address Assignment (DAA) procedure, allowing the slave devices to be assigned a Dynamic Address by the master device and also to modify the static address of slave devices to an address chosen by the same master device.

According to a first solution of the I3C protocol, the dynamic address of each slave device is set from the static address of the same slave device (which is usually the I2C static address). As previously discussed, however, this static address is fixed and hard to make it vary from one device to another, particularly in case of multiple identical devices coupled to the same communication bus.

According to a second solution of the I3C protocol, dynamic addressing is based on the slave devices arbitrating on the bus in open-drain mode to win an address assignment round, wherein the slave devices arbitrate on a PID (Provisional Identification) value, e.g., a 48-bit value.

The PID value is a unique ID allowing the master device to distinguish the various slave devices. This provisional ID may be randomly generated (by a random number generator) or be fixed for each slave device, containing a manufacturer ID, a part ID and an instance ID (INSTID); the instance ID part may be used to differentiate between identical slave devices and may be defined through OTP programming or PIN based variation.

Also this known solution generally has a limitation on the number of uniquely addressable slave devices, which is dependent, e.g., on the number of pins or programmable bits used for device address identification. Also, the random number generator usually is not a true generator and will be identical for devices of the same manufacturer, since a true random number generator to differentiate identical devices from a single manufacturer is expensive and complex for small scale devices like sensor devices.

BRIEF SUMMARY

In an embodiment, a digital communication system comprises: a master device; and a plurality of slave devices, which, in operation, are communicatively coupled with the master device over a shared data communication bus, the slave devices being coupled together in a daisy-chain configuration during an address assignment procedure, wherein each slave device has a daisy-chain input and a daisy-chain output, the daisy-chain input of a first slave device being coupled to a daisy-chain enabling output of the master device, the daisy-chain input of subsequent slave devices being coupled to the daisy-chain output of a previous slave device in the daisy chain configuration, and wherein the master device, in operation, assigns respective dynamic addresses to the slave devices based on the arrangement of the slave devices in the daisy-chain configuration. In an embodiment, the master device, in operation, assigns respective dynamic address to each slave device from a list of available different dynamic addresses. In an embodiment, during the address assignment procedure, the slave devices are assigned respective different provisional identification values based on the arrangement of the daisy chain configuration, and the master device, in operation, assigns different dynamic addresses based on the different provisional identification values. In an embodiment, the slave devices have an internal counter incrementing cyclically and determining, at the end of the address assignment procedure, the respective provisional identification value; and wherein a high value of the daisy-chain input is designed to block the internal counter and is assigned cyclically to the slave devices in the daisy chain configuration starting from the first slave device to the last slave device, with the remaining slave devices having a low value of the daisy chain input, which is designed to enable the respective internal counter.

In an embodiment, a method comprises: coupling a master device and a plurality of slave devices together over a shared communication bus; coupling the plurality of slave devices together in a daisy chain configuration, each slave device having a daisy-chain input and a daisy-chain output, the daisy-chain input of a first slave device of the plurality of slave devices being coupled to a daisy chain enable output of the master device, and daisy chain inputs of subsequent slave devices of the plurality of slave devices being coupled to a daisy-chain output of a previous slave device in the daisy chain configuration; assigning, by the master device, respective dynamic addresses to the slave devices based on a position of the slave devices in the daisy-chain configuration. In an embodiment, the method comprises, assigning to the slave devices respective different provisional identification values based on positions of the slave devices in the daisy chain configuration, wherein assigning, by the master device, of the respective dynamic addresses is based on the different provisional identification values of the slave devices.

In an embodiment, a master device comprises: an interface, which, in operation, couples the master device to a plurality of slave devices via a communication bus, the plurality of slave devices being coupled together in a daisy chain configuration; a daisy-chain enable output, which, in operation, couples the master device to a daisy chain input of a first slave device of the daisy chain configuration; a daisy-chain feedback input, which, in operation, couples the master device to a daisy chain output of a last slave device of the daisy chain configuration; and control circuitry coupled to the interface, to the daisy-chain enable output, and to the daisy-chain feedback input, wherein the control circuitry, in operation, assigns respective dynamic addresses to the slave devices of the plurality of slave devices based on respective positions of the slave devices in the daisy chain configuration.

BRIEF DESCRIPTION OF THE SEVERAL VIEWS OF THE DRAWINGS

For a better understanding of the present disclosure, example embodiments thereof are now described, purely by way of non-limiting example and with reference to the attached drawings, wherein.

DETAILED DESCRIPTION

As will be discussed in detail, the present disclosure provides a way for multiple (even identical) slave devices on a same communication bus to be addressed differently based on the definition of a daisy chain arrangement by the master device during a dynamic-addressing initialization phase (preliminary to data communication).

Figure 1:
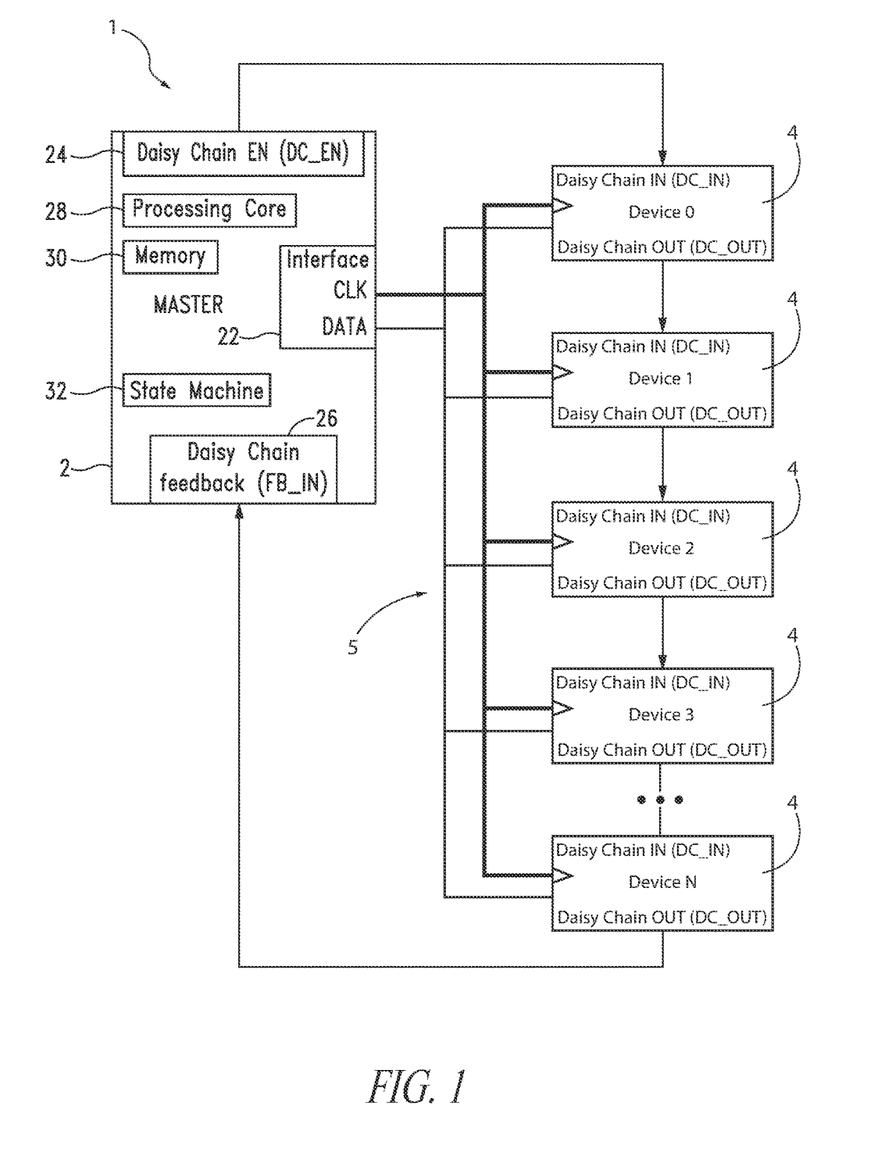
FIG. 1 shows a schematic block diagram of a digital communication system configured for dynamic addressing, according to an aspect of the present disclosure.

As shown in FIG. 1 a digital system 1 comprises a master (or host) device 2, which communicates with a number of slave devices 4 (in the example N, denoted as Device0-Device N) over a digital communication bus 5 (in the example operating according to the I3C protocol), including a data communication line DATA (for bidirectional data communication between the slave and master devices) and a clock line CLK (carrying a clock signal for synchronization). As illustrated, the master device 2 includes an interface 22, which, in operation, couples to the communication bus 5, one or more processing cores 28, one or more memories 30 and one or more state machines 32.

According to an aspect of the present disclosure, in a dynamic-addressing initialization phase, the slave devices 4 are arranged, by the master device 2, according to a dedicated daisy-chain (or series) arrangement, each slave device 4 having a daisy-chain input DC_IN and a daisy-chain output DC_OUT.

The daisy-chain input DC_IN of a slave device 4 is generally coupled to the daisy-chain output DC_OUT of the previous device in the daisy chain arrangement, with the exception of the daisy-chain input DC_IN of the first slave device 4 (in the example, Device0), which is coupled to a daisy-chain enabling output DC_EN 24 of the master device 2 and the daisy-chain output DC_OUT of the last slave device 4 (in the example, DeviceN) which is coupled to a daisy-chain feedback input FB_IN 26 of the same master device 2. In other words, the daisy chain input is provided by the master device 2 and the last daisy chain output is sent back to the same master device 2, as a feedback.

It is noted that the daisy-chain input DC_IN of the slave devices 4 may correspond to a generally available set address (SA) input o pin, an input used in known solutions to provide setting of a static address of the same slave devices 4 (for example of a most significant bit of the same static address); moreover, the daisy-chain output DC_OUT of the slave devices 4 may correspond to an interrupt output, used in normal operations to communicate interrupts from the slave devices 4 to the master device 2 and/or to other slave devices 4.

As will be discussed in detail, the daisy-chain output DC_OUT of a slave device 4 will be used to allow setting of the dynamic address of a following slave device 4 in the daisy chain arrangement.

In a first embodiment, the dynamic addressing solution makes use of the static address of the slave devices 4 to assign a respective dynamic address, providing an option to optimize this approach for multiple device addressing (even for identical devices) with minimal modification and use of a single static address.

In an initial step (represented in FIG. 2A), the daisy-chain enabling output DC_EN of the master device 2 is set to '1' (digital high) or to a fixed value connected to an internal power supply voltage (VDD). This makes the first slave device 4 (Device0) in the chain, with daisy-chain input DC_IN connected to the daisy-chain enabling output DC_EN, to have its static address with a first configuration 'SA1,' with its set address bit (SA) having a high value.

Figure 2A:
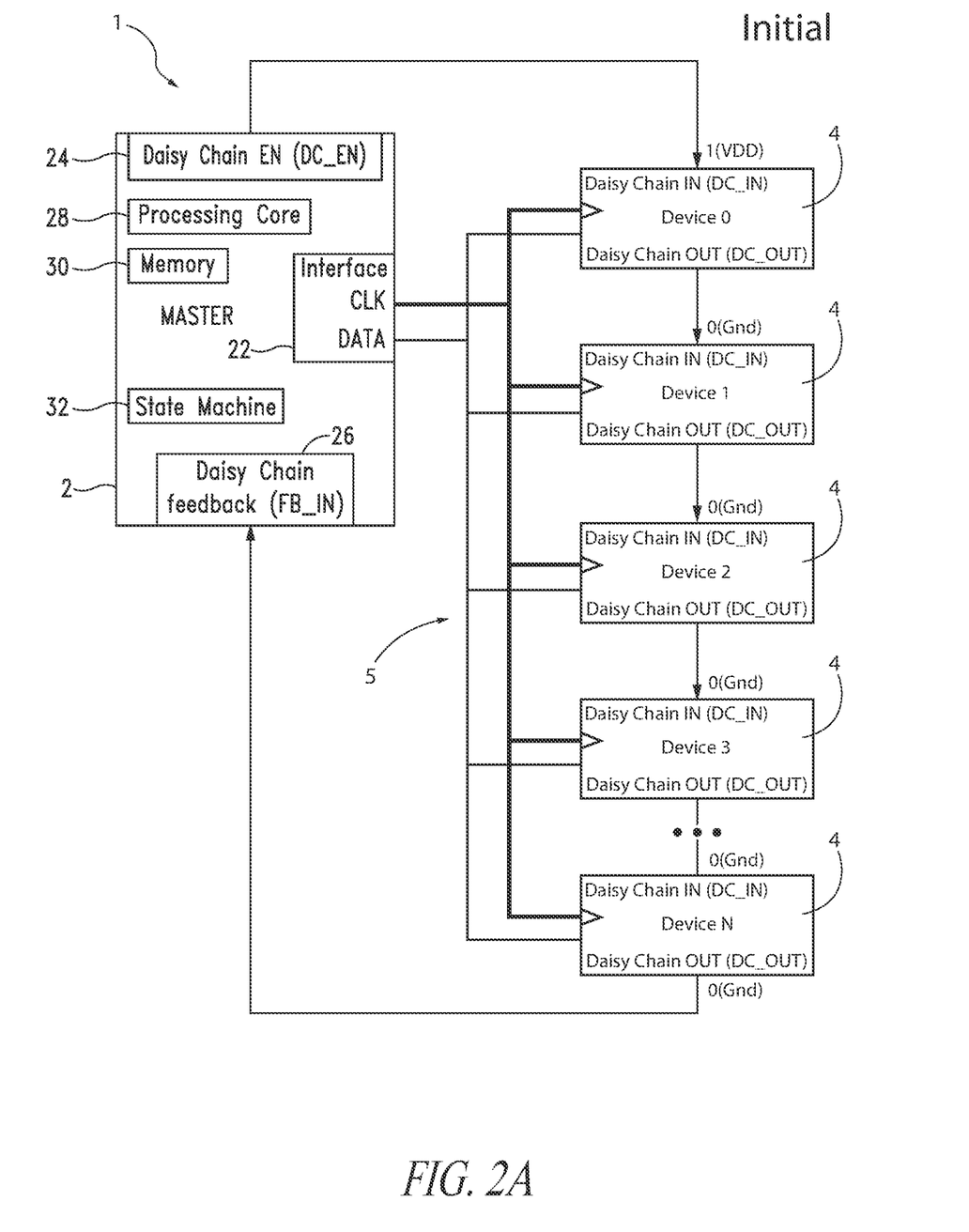
FIGS. 2A-2C shows the digital communication system of FIG. 1, in an initial, intermediate and, respectively, final dynamic-addressing operating state, according to a first embodiment of the present disclosure.

All other slave devices 4 have their daisy-chain input DC_IN connected to the daisy-chain output DC_OUT of the previous slave device which is driving a low value '0' (digital low), so they will have their static address with a second, different, configuration 'SA0,' with their set address bit having a low value.

The master device 2 is then configured to assign to the first slave device 4 (in general to the only slave device 4 in the daisy-chain arrangement having the static address SA1 and having not yet been assigned a dynamic address) a dynamic address different from SA0/SA1 (this dynamic address being taken, e.g., from a list of addresses available to the master device 2).

It is noted that the command 'SETDASA' provided by the I3C protocol (for the master to assign a Dynamic Address to a slave with a known Static Address) can be used by the master device 2 for the purpose of setting the dynamic address starting from the known static address.

This operation allows the reuse of the same static address SA1 for the assignment of the dynamic address for the slave device 4 next in the daisy-chain arrangement.

Figure 2B:
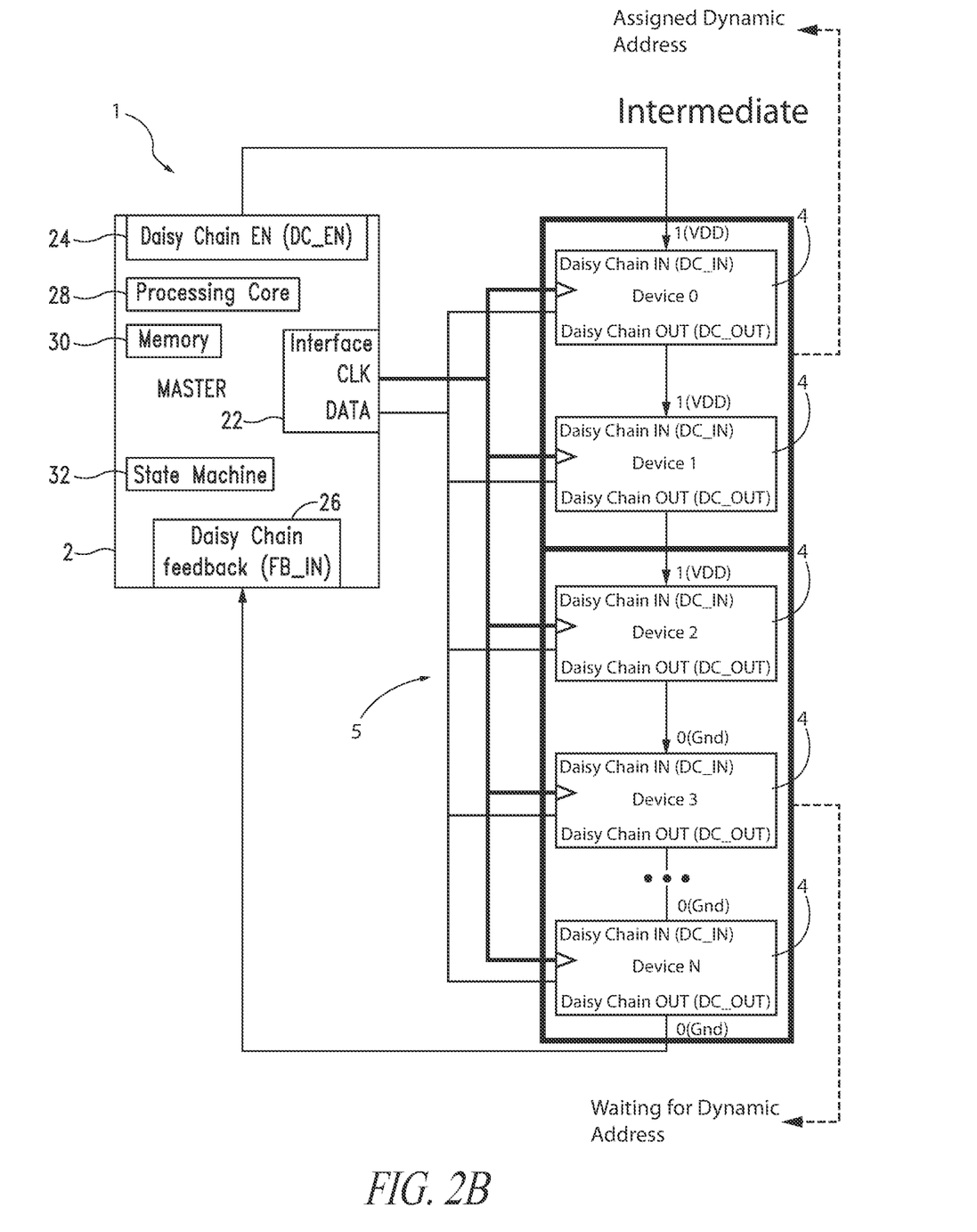

Indeed, as shown in FIG. 2B, once the dynamic address for the first slave device Device0 has been assigned, the daisy-chain output DC_OUT of the same first slave device is driven to a high value '1' (digital high), so that the next slave device 4 in the chain (in this case the second slave device, Device 1) will have its static address set to 'SA1.'

As shown in the same FIG. 2B, the master device 2 has already assigned a different dynamic address to the second slave device Device1 (again, based on the static address SA1), so that also the daisy-chain output DC_OUT of the same second slave device is driven to the high value '1.' This has shifted the static address SA1 to the third slave device Device2 in the daisy-chain arrangement, which will then be assigned its respective different dynamic address by the same master device 2.

Figure 2C:
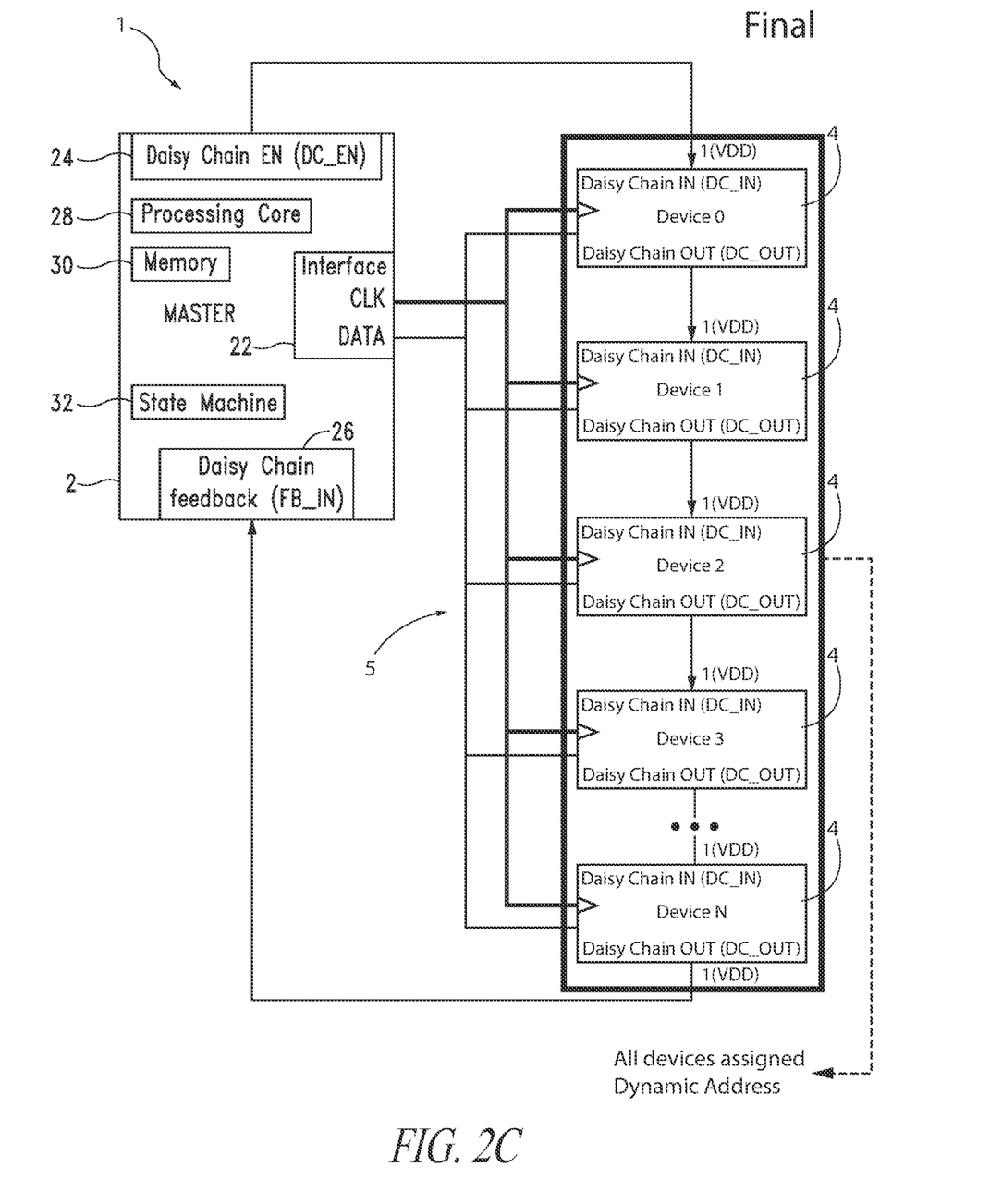

The master device 2 checks the value of the daisy-chain feedback input FB_IN to determine if the dynamic addressing procedure is complete: if the value is '0,' the same master device 2 will continue the procedure of dynamic address assignment (as previously discussed, with the next slave device in the chain having the static address SA1 be assigned a respective different dynamic address, in a iterative loop); if the value is '1' (as shown in FIG. 2C), then the master device 2 will determine that the dynamic address assignment procedure is complete, with all slave devices 4 in the chain having received a respective different dynamic address.

It is noted that the master device 2 may also verify the end of the dynamic addressing procedure using an internal incremental counter, cross-checking the counter value with a known number of slave devices 4 coupled to the digital communication bus 5; this may be useful to check the correct connection of all slave devices 4 in the daisy-chain arrangement and/or the presence of unknown devices inserted in the chain.

Figure 3:
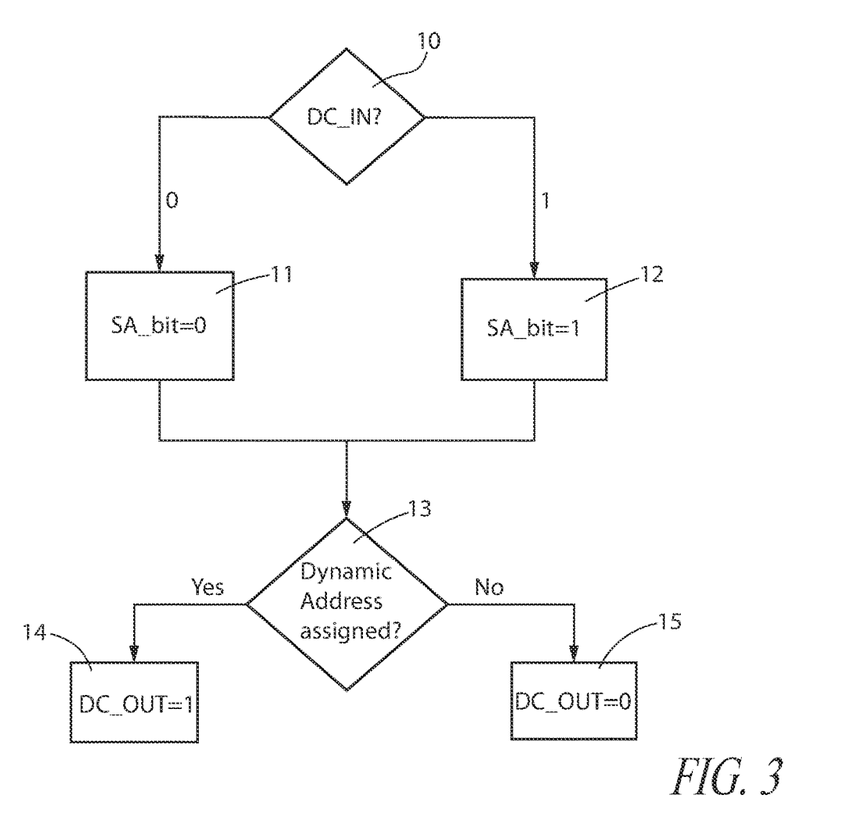
FIG. 3 shows a flow chart of dynamic addressing operations in the digital communication system of FIG. 1, performed by a slave device, according to the first embodiment of the present disclosure.

FIG. 3 shows a schematic flow chart of the previously discussed dynamic-address assignment operations performed by a slave device 4.

As previously discussed, the slave device 4, in a first step 10, checks the value of the respective daisy-chain input DC_IN.

If the value of the bit is '0,' the set address bit is set to the low value (determining the second configuration 'SA0' for the static address), as shown at step 11; if the value of the bit is '1,' the set address bit is set to the high value (determining the first configuration 'SA1' for the static address), as shown at step 12.

As shown at step 13, the slave device 4 checks if the respective dynamic address has been assigned.

If it has already been assigned, step 14, then the respective daisy-chain output DC_OUT is set to the high value '1'; if it has not yet been assigned, step 15, the respective daisy-chain output DC_OUT is set to the low value '0.'

The discussed dynamic addressing solution therefore allows the slave devices 4 to send out a dynamic-address set flag or token to an output port coupled to the slave device next in the chain (through the daisy-chain output DC_OUT); this flag will then be used as a set address input for the static address of the slave device next in the chain. By doing this in a iterative loop all slave devices 4 can be assigned different dynamic addresses by using a single static address (determined by the set address bit SA1).

Figure 4:
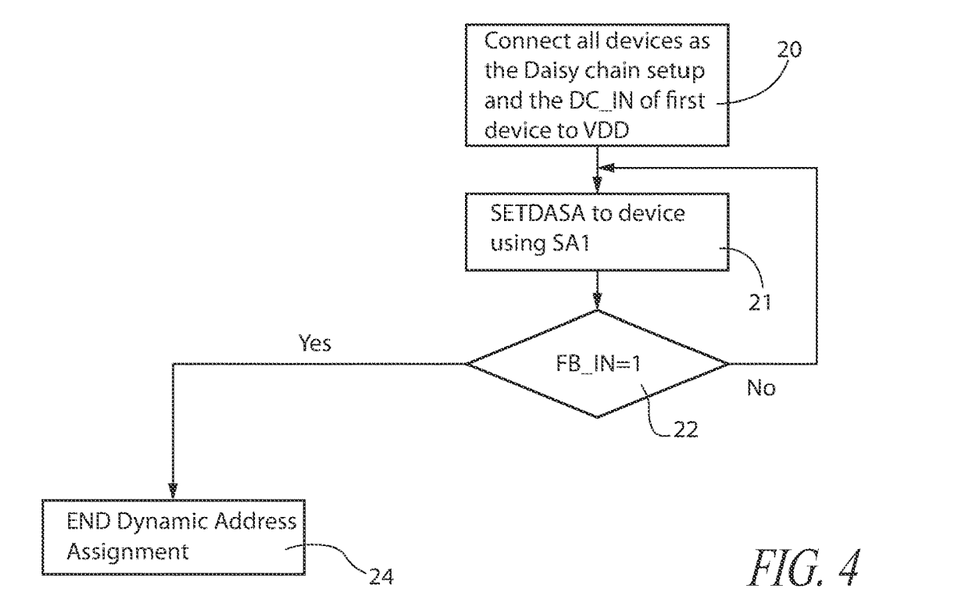
FIG. 4 shows a flow chart of dynamic addressing operations in the digital communication system of FIG. 1, performed by the master device, according to the first embodiment of the present disclosure.

FIG. 4 shows a schematic flow chart of the previously discussed operations for dynamic address assignment performed by of the master device 2.

In a first step 20, the master device 2 sets up the daisy chain arrangement of the slave devices 4 and connects the daisy chain input DC_IN of the first slave device to VDD (or to the high logic level).

Then, the master device 2 initiates the loop of setting the dynamic address of the slave device 4 in the chain having, at each iteration, the static address set to the first configuration 'SA1' e.g., using the 'SETDASA' command provided by the I3C protocol, as shown at iterative step 21.

As previously discussed, the master device 1 may have a list of M (M being any suitable number, higher or equal to the number N of slave devices 4 connected to the digital communication bus 5) available different dynamic addresses D_ADD [m] to be assigned to a respective slave device 4, with m being an index incrementing at each loop iteration.

As shown at step 22, at each iteration, after assigning the dynamic address of a slave device 4, the master device 2 checks the daisy-chain feedback input FB_IN to determine the status of the dynamic addressing procedure: if the value is '0,' then the same master device 2 will continue the procedure of dynamic address assignment (as previously discussed, using static address SA1 to assign the respective different dynamic address of the next device in the chain), returning to step 21; if the value is '1,' then the master device 2 determines that the dynamic address assignment procedure is complete, with all slave devices 4 in the chain having received a respective different dynamic address, as shown at step 24.

A second embodiment of the dynamic addressing solution envisages use of a provisional ID (PID) value of the slave devices 4 to assign the respective, different, dynamic addresses, in particular providing an easy and efficient method to set a differentiating variable part of the PID value (e.g., the instance ID, INSTID, part) even in case of identical slave devices coupled to the digital communication bus 5.

Figure 5A:
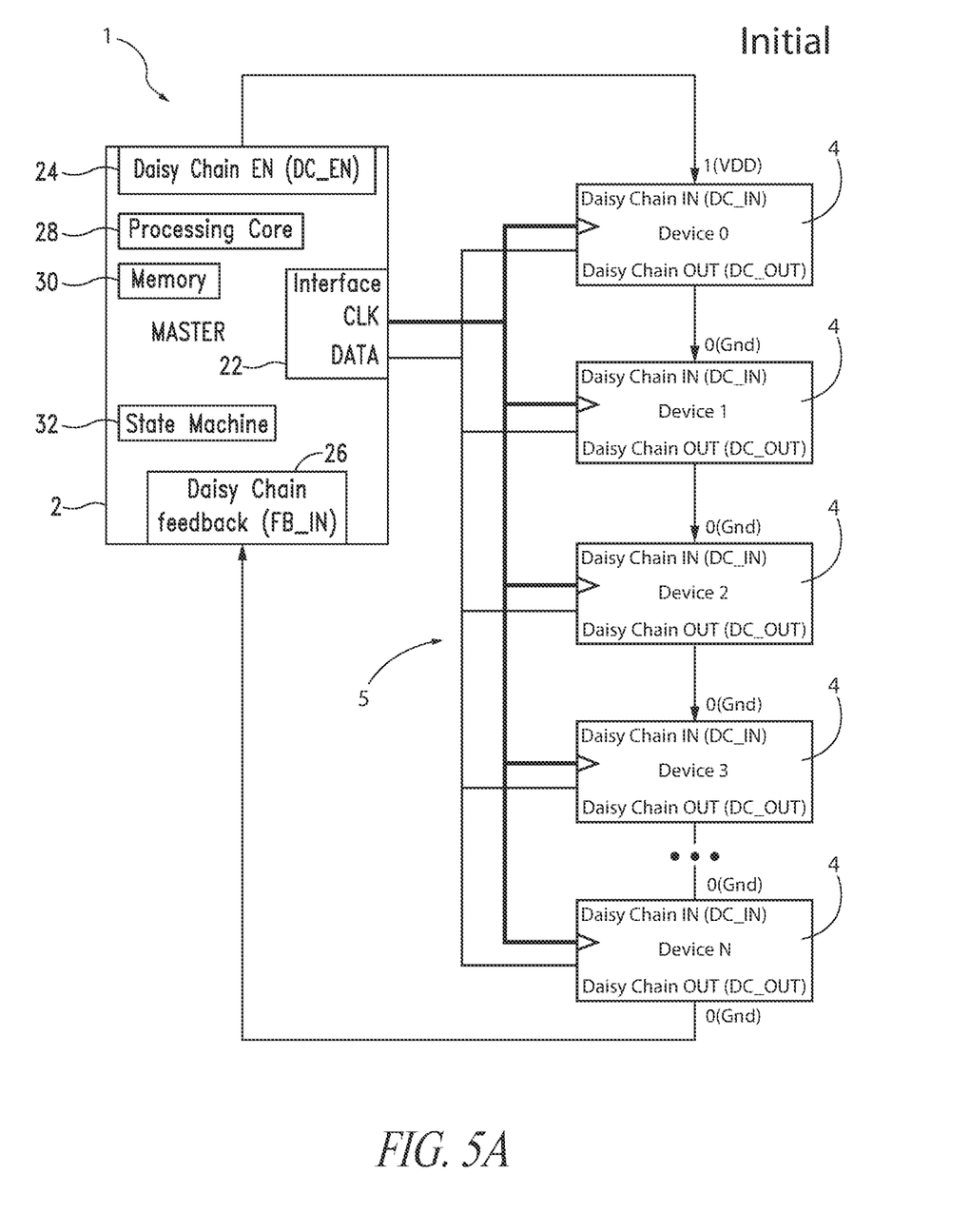
FIGS. 5A-5C shows the digital communication system of FIG. 1, in an initial, intermediate and, respectively, final dynamic-addressing operating state, according to a second embodiment of the present disclosure.

Also for this second embodiment, as shown in FIG. 5A, the master device 2 starts with setting up the same daisy chain arrangement of the slave devices 4 and moreover connecting the daisy chain input DC_IN of the first slave device Device0 to VDD (or high logic level).

In this case, the high value of the daisy chain input DC_IN determines, for the first slave device Device0, blocking of a counter internal to the same slave device 4; the counter (starting from a zero count value) determines, as will also be discussed later, the instance ID part of the PID value for the same slave device 4, which will later be used for dynamic address configuration (e.g., according to the ENTDAA command provided by the I3C protocol, in a manner here not discussed in detail).

On the contrary, a low value of the daisy chain input DC_IN (since the daisy chain output DC_OUT for all previous devices is low or logic '0') determines, for all the other slave devices 4 in the daisy chain arrangement, enabling of the internal counter, which therefore is enabled to increment its count value.

The master device 2 then sends on the digital communication bus 5 a custom command for the slave devices 4 to set the instance ID, including for example two data bytes in case the number of slave devices 4 on the digital communication bus 5 is lower or equal to 16 (a higher number of bytes may be envisaged, as an alternative). The data bytes are useless (having a 'don't care' value), but the clock pulses sent during this data transmission are used to re-latch the daisy chain input DC_IN to the daisy chain output DC_OUT of the slave devices 4 and to increment the internal counter of the same slave devices 4, if enabled.

Figure 5B:
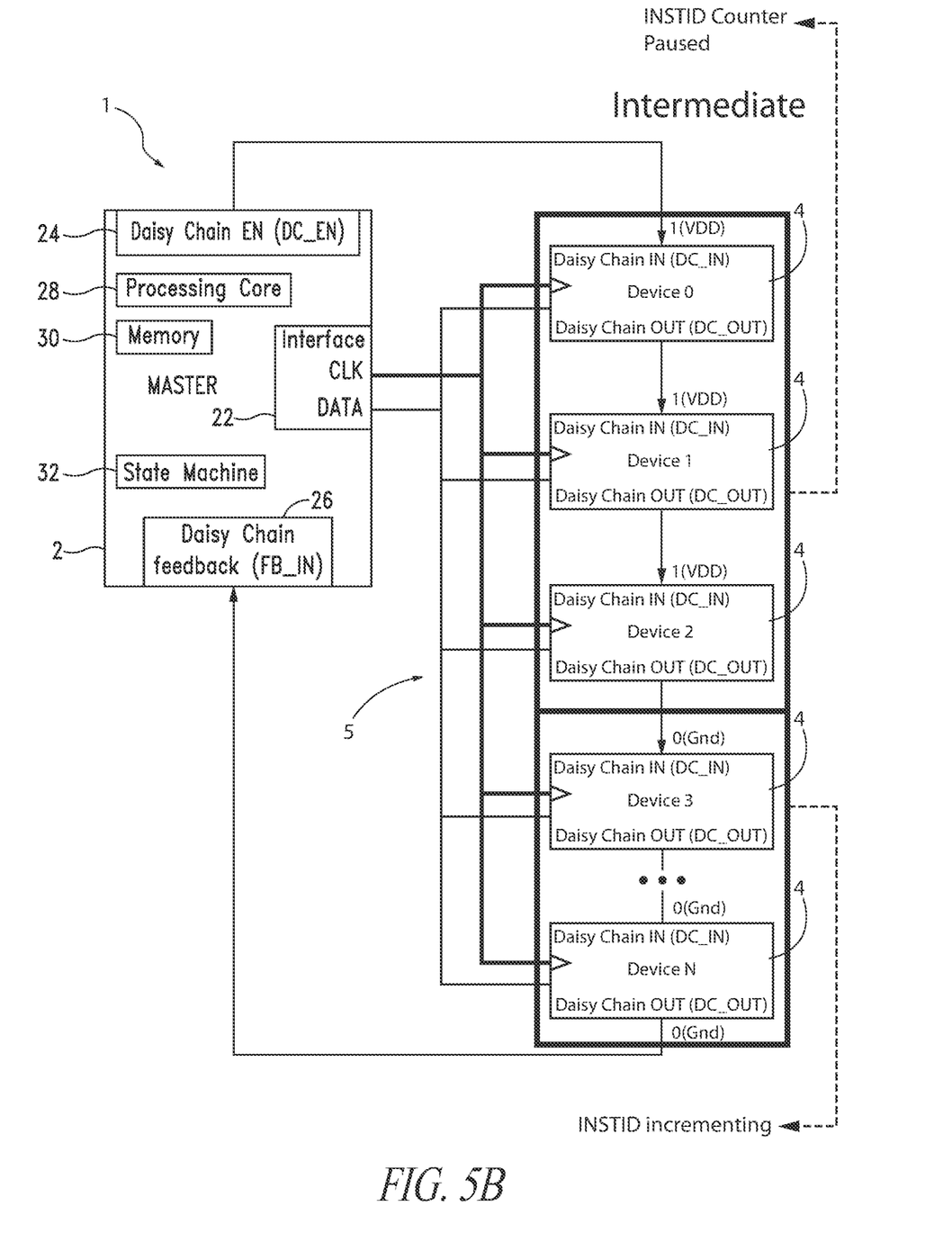

Accordingly, after each clock cycle the number of slave devices 4 with daisy chain output DC_OUT '1' (and internal counter paused) increases, as shown in FIG. 5B, representing an intermediate situation for the dynamic address assignment procedure. The internal counter of these slave devices 4 will thus be stopped at respective different incremental counter values.

Figure 5C:
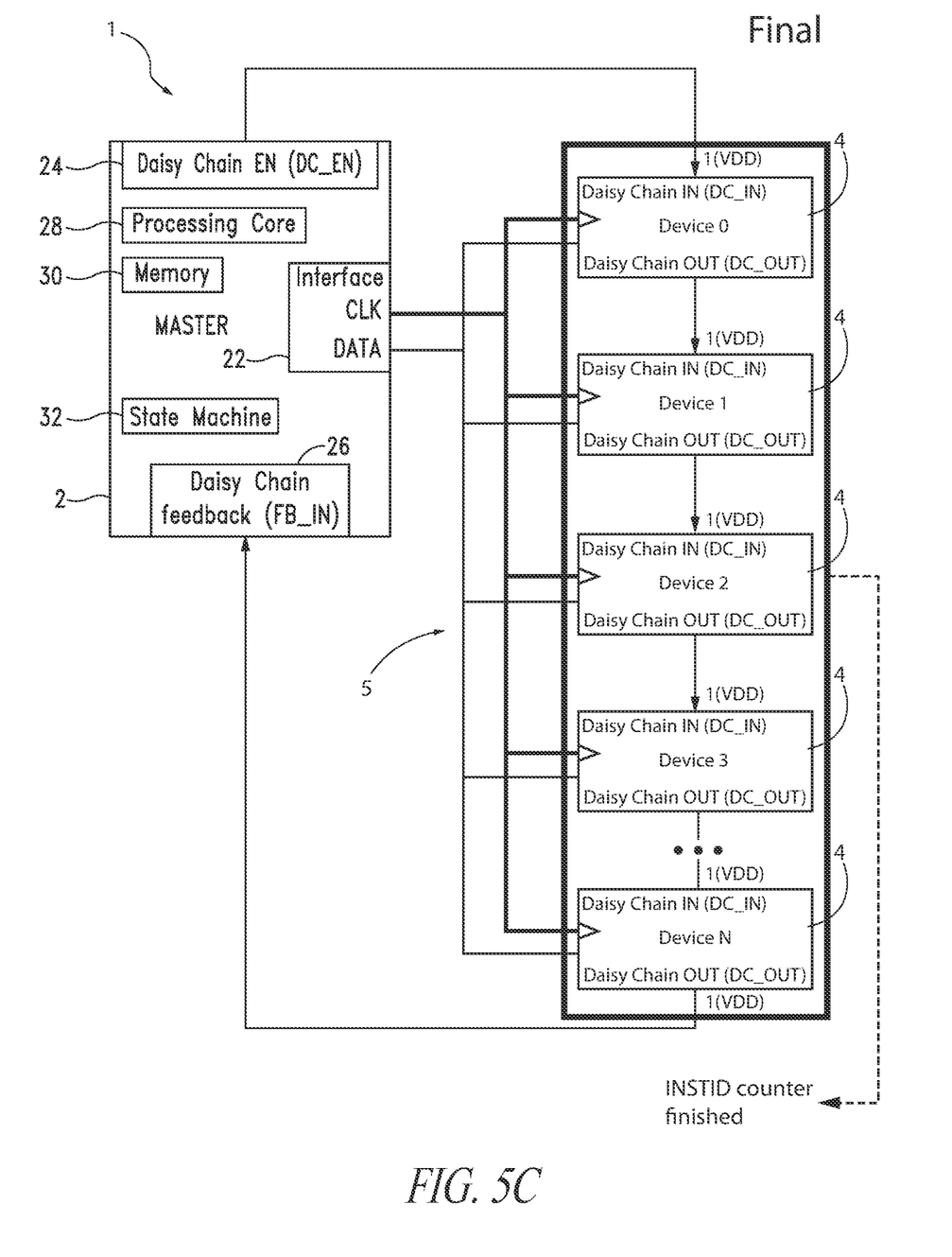

Once the daisy chain output DC_OUT of the last slave device 4 is '1,' as shown in FIG. 5C, the master device 2 will then send a command (e.g., the ENTDAA command according to the I3c protocol) to assign the dynamic address of the slave devices 4, which can all be distinguished based on their provisional ID (PID) values.

In particular, according to this solution the instance ID field of the PID will be different for the various slave devices 4, being dependent on the differently incremented value of the respective internal counters.

It is noted that if the instance ID field has 4 bits, up to 16 slave devices 4 can be provided a different dynamic address, with this embodiment. If there are more slave devices 4, the internal counter will overflow and the devices after the 16th device will have the same instance ID field; in that case, according to an aspect of the present disclosure, the daisy chain output DC_OUT will also be forced to '1' despite the value of the daisy chain input DC_IN, in order to force the interruption of the dynamic address assignment procedure (even before reaching the full counter value).

It is however clear that, if needed, based on the number of slave devices 4, a higher number of bits may be used for the internal counter and instance ID field of the PID value.

Figure 6:
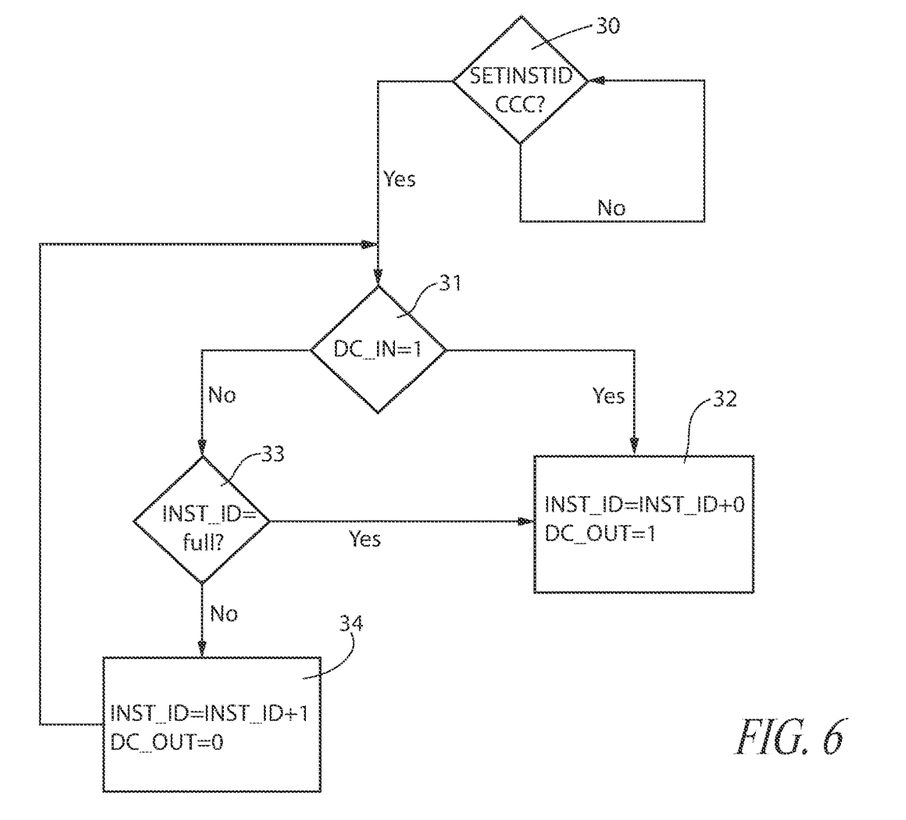
FIG. 6 shows a flow chart of dynamic addressing operations in the digital communication system of FIG. 1, performed by a slave device, according to the second embodiment of the present disclosure.

FIG. 6 shows a schematic flow chart of the previously discussed operations performed by a slave device 4 for dynamic address assignment according to the second embodiment.

Each slave device 4, in a first step 30, checks the presence of the set instance ID command (SETINSTID CCC) on the digital communication bus 5, provided by the master device 2.

If the above command is present, the slave device 4 checks the value of the daisy chain input DC_IN, as shown at step 31; otherwise, the same slave device 4 waits for the instance ID command.

If the value of the daisy chain input DC_IN is high ('1'), the internal counter determining the instance ID value is stopped (the same instance ID value will therefore be kept constant, during all subsequent clock cycles) and the daisy chain output DC_OUT is set to the high value, step 32.

If instead the value of the daisy chain input DC_IN is low, the slave device 4 checks if the instance ID internal counter is full, step 33.

In case the counter is full, again the internal counter is stopped and the daisy chain output DC_OUT is set to the high value, at the above step 32.

If instead the instance ID counter is not full, the same counter is incremented, at step 34, and the value of the daisy chain output DC_OUT is driven to the low value.

Figure 7:
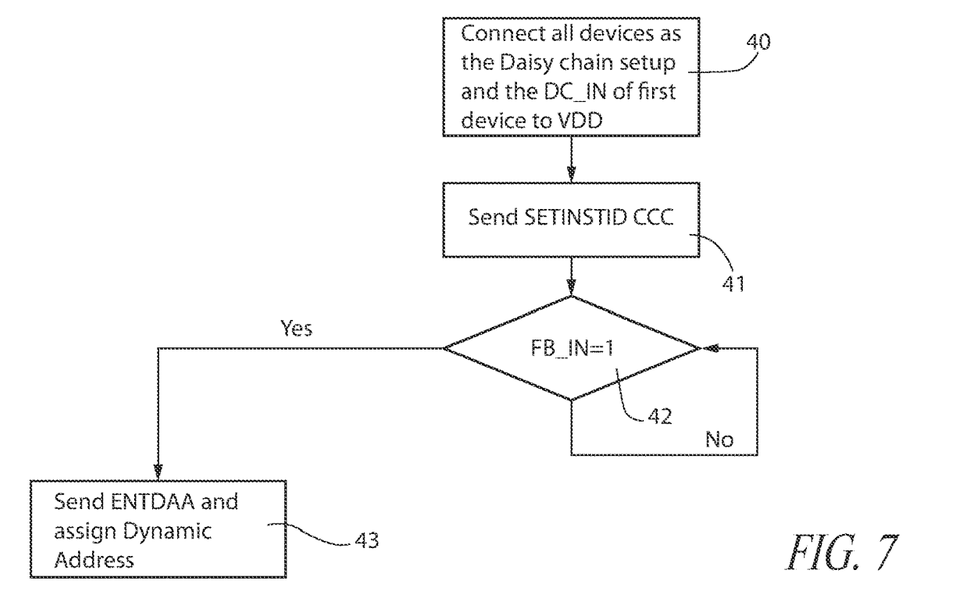
FIG. 7 shows a flow chart of dynamic addressing operations in the digital communication system of FIG. 1, performed by the master device, according to the second embodiment of the present disclosure.

FIG. 7 shows a schematic flow chart of the previously discussed operations for dynamic address assignment, in this case performed by the master device 2.

In a first step 40, the master device 2 sets up the daisy chain arrangement of the slave devices 4 and connects the daisy chain input DC_IN of the first slave device Device0 to VDD (or high logic level).

Then, at step 41, the master device 2 sends on the digital communication bus 5 the custom set instance ID command (SETINSTID CCC), in the example having a maximum of two bytes of data (it is however again underlined that a different amount of data may be provided, e.g., only one byte if a maximum of eight slave devices 4 is envisaged or more than two bytes if a greater number of slave devices 4 is coupled to the digital communication bus 5).

The master device 2 then waits for the daisy-chain feedback input FB_IN to have a high value, as shown at step 42, when the daisy chain output DC_OUT of the last slave device DeviceN is '1,' after that the master device 2 sends the command (e.g., the standard ENTDAA command according to the I3c protocol) to assign the dynamic address using the previously determined provisional ID (PID) values to differentiate and distinguish the slave devices 4.

Since the PID values for the various slave devices 4 are all different (due to each slave device 4 having a different instance ID, being the result of a differently incremented internal counter), the master device 2 will be able to assign all different dynamic addresses during the dynamic address assignment procedure.

The advantages of the solution proposed are clear from the foregoing description.

In any case, it is again underlined that the disclosed dynamic addressing system and method allow devices of even identical features to be assigned different dynamic addresses and be used on the same digital communication bus, providing an increased efficiency and flexibility with respect to known solutions.

The proposed embodiment also allows slave devices to be numbered and identified based on their distance from the master device, which may be helpful, e.g., in IoT applications, to verify which device has blocked the connection.

The uniquely assigned dynamic address could also be useful in determining the location of the devices, which is known based on the daisy chain sequence, and that could be useful in collecting multiple data from different locations and uniquely identifying the devices based on their dynamic address.

In particular, each Instance ID in the solution according to the second embodiment, could also be used as positional ID for IoT, industrial and Automotive applications.

Moreover, the feedback line at the input of the master device could also be used as a security check for the master device to verify that the dynamic addresses have correctly been assigned for all slave devices.

In particular, in the first embodiment, the master device may verify that the desired number of devices programmed during the initialization phase is reached.

In case of the second embodiment, the master device receives the feedback after a number of clock cycles after the set instance ID command; by counting the clocks and comparing the value to the number of slave devices to which a dynamic address has been assigned (e.g., with the ENTDAA procedure), the master device can verify that the correct number of devices are present on the bus and that, e.g., no device is sneaking on the bus to disrupt the communication.

The possibility of assigning a dynamic address in the I3C protocol, combined with its speed and flexibility, makes this embodiment usable in multiple fields of application; implementing this feature, the master device can use multiple devices and needs minimal programming and customization.

It is moreover clear that modifications and variations may be made to what has been described and illustrated herein, without thereby departing from the scope of the present disclosure.

In particular, it is underlined that embodiments of the present disclosure may be advantageously implemented also for other digital interface protocols (different from the I3C protocol), requiring the assignment of dynamic addresses to a number of (even identical) slave devices coupled to a same digital communication bus.

A digital communication system (1), may be summarized as including a master device (2) and a number of slave devices (4) coupled in communication with the master device (2) over a shared data communication bus (5), wherein, during an address assignment procedure, the master device (2) is configured to assign different respective dynamic addresses to the slave devices (4) in order to address the slave devices (4) for data communication, characterized in that the slave devices (4) are designed to be arranged in a daisy-chain configuration during the address assignment procedure, wherein each slave device (4) has a daisy-chain input (DC_IN) and a daisy-chain output (DC_OUT), the daisy-chain input of a slave device being coupled to the daisy-chain output of a previous slave device in the daisy chain configuration, the daisy-chain input of a first slave device being coupled to a daisy-chain enabling output (DC_EN) of the master device (2), and in that the master device (2) is configured to assign the respective dynamic addresses to the slave devices (4) based on their arrangement in the daisy-chain configuration.

The daisy-chain input (DC_IN) may be designed to set a static address (SA) of the slave devices (4); and the master device (2) may be configured to assign the respective dynamic address based on the static address of the slave devices (4).

A high value of the daisy chain input (DC_IN) may be designed to set a first static address (SA1) for the respective slave device (4) and may be assigned cyclically to the slave devices in the daisy chain configuration starting from the first slave device to the last slave device, with the remaining slave devices (4) having a low value of the daisy chain input (DC_IN), which may be designed to set a second, different, static address (SA0); and the master device (2) may be configured to assign a respective different dynamic address to the slave device (4) each cycle assuming the first static address (SA1), the dynamic address being different than the first and second static addresses.

The master device (2) may be configured to set to the high value the daisy-chain input (DC_IN) of the first slave device (4) in an initial step of the address assignment procedure by driving the daisy-chain enabling output (DC_EN); and the slave device (4), having been assigned a dynamic address, may be configured to drive the respective daisy-chain output (DC_OUT) to the high level, so as to set to the high value the daisy-chain input (DC_IN) of the subsequent slave device (4) in the daisy chain arrangement.

The master device (2) may be configured to assign the respective dynamic address to each slave device (4) from a list of available different dynamic addresses.

During the address assignment procedure, the slave devices (4) may be assigned respective different provisional identification values (PID) based on the arrangement in the daisy chain configuration; and the master device (2) may be configured to assign the different dynamic addresses based on the different provisional identification values.

The slave devices (4) may have an internal counter incrementing cyclically and determining, at the end of the address assignment procedure, the respective provisional identification value; and a high value of the daisy-chain input (DC_IN) may be designed to block the internal counter and may be assigned cyclically to the slave devices (4) in the daisy chain configuration starting from the first slave device to the last slave device, with the remaining slave devices (4) having a low value of the daisy chain input (DC_IN), which may be designed to enable the respective internal counter.

The master device (2) may be configured to set to the high value the daisy-chain input (DC_IN) of the first slave device (4) in an initial step of the address assignment procedure by driving the daisy-chain enabling output (DC_EN); and the slave device (4) having the high daisy chain input may be configured to drive the respective daisy-chain output (DC_OUT) to the high level, so as to set to the high value the daisy-chain input (DC_IN) of the subsequent slave device (4) in the daisy chain arrangement.

The internal counter of the slave devices (4) may be designed to determine an instance ID part of the provisional identification value (PID) of the slave devices (4); and the master device (2) may be configured to determine the respective different dynamic address based on the different provisional identification values with a ENTDAA command provided by the I3C protocol.

The system, according to the daisy chain arrangement, the daisy-chain output (DC_OUT) of a last slave device (4) may be coupled to a daisy-chain feedback input (FB_IN) of the master device (2); and the master device (2) may be configured to check the value of the daisy-chain feedback input (FB_IN) to determine if the dynamic addressing procedure is complete.

The master device (2) may be configured to check the value of the daisy-chain feedback input (FB_IN) to further verify that the dynamic addresses have correctly been assigned for all slave devices (4) coupled to the digital communication bus (5).

The assigned dynamic addresses may be designed to provide location information of the slave devices (4), based on their arrangement in the daisy chain configuration.

The digital communication bus (5) may be configured to operate according to the I3C protocol.

A dynamic addressing method in a digital communication system (1) may be summarized as including a master device (2) and a number of slave devices (4) coupled in communication with the master device (2) over a shared data communication bus (5),
  including, during an address assignment procedure, assigning, by the master device (2), different respective dynamic addresses to the slave devices (4) in order to address the slave devices (4) for data communication,
  characterized by arranging, during the address assignment procedure, the slave devices (4) in a daisy-chain configuration, wherein each slave device (4) has a daisy-chain input (DC_IN) and a daisy-chain output (DC_OUT), the daisy-chain input of a slave device being coupled to the daisy-chain output of a previous slave device in the daisy chain configuration, the daisy-chain input of a first slave device being coupled to a daisy-chain enabling output (DC_EN) of the master device (2),
and in that assigning, by the master device (2), the respective dynamic addresses to the slave devices (4) is based on their arrangement in the daisy-chain configuration.

The daisy-chain input (DC_IN) may be designed to set a static address (SA) of the slave devices (4); and assigning, by the master device (2), the respective dynamic address may be based on the static address of the slave devices (4).

During the address assignment procedure, assigning to the slave devices (4) respective different provisional identification values (PID) based on the arrangement in the daisy chain configuration; and wherein assigning, by the master device (2), the different dynamic addresses may be based on the different provisional identification values.

In an embodiment, a digital communication system comprises: a master device; and a plurality of slave devices, which, in operation, are communicatively coupled with the master device over a shared data communication bus, the slave devices being coupled together in a daisy-chain configuration during an address assignment procedure, wherein each slave device has a daisy-chain input and a daisy-chain output, the daisy-chain input of a first slave device being coupled to a daisy-chain enabling output of the master device, the daisy-chain input of subsequent slave devices being coupled to the daisy-chain output of a previous slave device in the daisy chain configuration, and wherein the master device, in operation, assigns respective dynamic addresses to the slave devices based on the arrangement of the slave devices in the daisy-chain configuration. In an embodiment, the daisy-chain inputs of the plurality of slave devices are static address set bits of the slave devices, and the master device, in operation, assigns the respective dynamic address based on the static address of the slave devices. In an embodiment, a high value of the daisy chain input sets a first static address for a respective slave device and is assigned cyclically to the slave devices in the daisy chain configuration starting from a first slave device to a last slave device of the plurality of slave devices, with remaining slave devices of the plurality of slave devices having a low value of the daisy chain input, which sets a second, different, static address; and wherein the master device, in operation, assigns a respective different dynamic address to the slave device each cycle assuming the first static address, the dynamic address being different than the first and second static addresses. In an embodiment, the master device, in operation, sets to the high value the daisy-chain input of the first slave device in an initial step of the address assignment procedure by driving the daisy-chain enabling output; and wherein the first slave device, having been assigned a dynamic address, in operation, drives the daisy-chain output of the first slave device to the high level, so as to set to the high value the daisy-chain input of a subsequent slave device in the daisy chain configuration. In an embodiment, the master device, in operation, assigns respective dynamic address to each slave device from a list of available different dynamic addresses. In an embodiment, during the address assignment procedure, the slave devices are assigned respective different provisional identification values based on the arrangement of the daisy chain configuration, and the master device, in operation, assigns different dynamic addresses based on the different provisional identification values. In an embodiment, the slave devices have an internal counter incrementing cyclically and determining, at the end of the address assignment procedure, the respective provisional identification value; and wherein a high value of the daisy-chain input is designed to block the internal counter and is assigned cyclically to the slave devices in the daisy chain configuration starting from the first slave device to the last slave device, with the remaining slave devices having a low value of the daisy chain input, which is designed to enable the respective internal counter. In an embodiment, the master device, in operation, sets to the high value the daisy-chain input of the first slave device in an initial step of the address assignment procedure by driving the daisy-chain enabling output, and wherein the slave device having the high daisy chain input, in operation, drives the respective daisy-chain output to the high level, so as to set to the high value the daisy-chain input of the subsequent slave device in the daisy chain configuration. In an embodiment, the internal counter of the slave devices is designed to determine an instance ID part of the provisional identification value of the slave devices; and wherein the master device is configured to determine the respective different dynamic address based on the different provisional identification values with a ENTDAA command provided by an I3C protocol. In an embodiment, according to the daisy chain arrangement, the daisy-chain output of a last slave device is coupled to a daisy-chain feedback input of the master device; and the master device, in operation, checks a value of the daisy-chain feedback input to determine if the dynamic addressing procedure is complete. In an embodiment, the master device, in operation, checks the value of the daisy-chain feedback input to verify that the dynamic addresses have correctly been assigned for all slave devices coupled to the digital communication bus. In an embodiment, the assigned dynamic addresses provide location information of the slave devices, based on their arrangement in the daisy chain configuration. In an embodiment, the digital communication bus, in operation, operates according to an I3C protocol.

In an embodiment, a method comprises: coupling a master device and a plurality of slave devices together over a shared communication bus; coupling the plurality of slave devices together in a daisy chain configuration, each slave device having a daisy-chain input and a daisy-chain output, the daisy-chain input of a first slave device of the plurality of slave devices being coupled to a daisy chain enable output of the master device, and daisy chain inputs of subsequent slave devices of the plurality of slave devices being coupled to a daisy-chain output of a previous slave device in the daisy chain configuration; assigning, by the master device, respective dynamic addresses to the slave devices based on a position of the slave devices in the daisy-chain configuration. In an embodiment, the daisy-chain input is a static address set input of the slave devices, and the assigning, by the master device, of the respective dynamic addresses is based on the static addresses of the slave devices. In an embodiment, the method comprises, assigning to the slave devices respective different provisional identification values based on positions of the slave devices in the daisy chain configuration, wherein assigning, by the master device, of the respective dynamic addresses is based on the different provisional identification values of the slave devices.

In an embodiment, a master device comprises: an interface, which, in operation, couples the master device to a plurality of slave devices via a communication bus, the plurality of slave devices being coupled together in a daisy chain configuration; a daisy-chain enable output, which, in operation, couples the master device to a daisy chain input of a first slave device of the daisy chain configuration; a daisy-chain feedback input, which, in operation, couples the master device to a daisy chain output of a last slave device of the daisy chain configuration; and control circuitry coupled to the interface, to the daisy-chain enable output, and to the daisy-chain feedback input, wherein the control circuitry, in operation, assigns respective dynamic addresses to the slave devices of the plurality of slave devices based on respective positions of the slave devices in the daisy chain configuration. In an embodiment, the daisy-chain input of the first slave device is a static address set input of the first slave device, a daisy-chain input of a second slave device is a static address set input of the second slave device and is coupled to a daisy-chain output of the first slave device, and the assigning of the respective dynamic addresses is based on the static addresses of the slave devices. In an embodiment, the assigning respective dynamic addresses comprises: assigning respective provisional identification values to the slave devices of the plurality of slave devices based on positions of the slave devices in the daisy chain configuration; and assigning respective dynamic addresses based on the respective provisional identification values of the slave devices. In an embodiment, the assigning respective provisional identification values to the slave devices of the plurality of slave devices includes sequentially disabling counters of the plurality of slave devices. In an embodiment, the assigning respective dynamic addresses based on the respective provisional identification values of the slave devices includes assigning the respective dynamic addresses in response to a indication received via the daisy-chain feedback input that the assignment of the respective provisional identification values to the slave devices is complete.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A digital communication system, comprising:
a master device; and
a plurality of slave devices, which, in operation, are communicatively coupled with the master device over a shared data communication bus, the slave devices being coupled together in a daisy-chain configuration during an address assignment procedure,
wherein each slave device has a daisy-chain input and a daisy-chain output, the daisy-chain input of a first slave device being coupled to a daisy-chain enabling output of the master device, the daisy-chain input of subsequent slave devices being coupled to the daisy-chain output of a previous slave device in the daisy-chain configuration, and
wherein the master device, in operation, assigns respective dynamic addresses to the slave devices based on an arrangement of the slave devices in the daisy-chain configuration, and the assigning respective dynamic addresses to the slave devices includes selectively disabling counters of slave devices of the plurality of slave devices.

2. The system according to claim 1, wherein the daisy-chain inputs of the plurality of slave devices are static address set bits of the slave devices, and the master device, in operation, assigns the respective dynamic address based on the static address of the slave devices.

3. The system according to claim 2, wherein, in operation, a high value of the daisy-chain input sets a first static address for a respective slave device and is assigned cyclically to the slave devices in the daisy-chain configuration starting from a first slave device to a last slave device of the plurality of slave devices, with remaining slave devices of the plurality of slave devices having a low value of the daisy-chain input, which sets a second, different, static address; and wherein the master device, in operation, assigns a respective different dynamic address to the slave device each cycle assuming the first static address, the dynamic address being different than the first and second static addresses.

4. The system according to claim 3, wherein the master device, in operation, sets to the high value the daisy-chain input of the first slave device in an initial step of the address assignment procedure by driving the daisy-chain enabling output; and wherein the first slave device, having been assigned a dynamic address, in operation, drives the daisy-chain output of the first slave device to a high level, so as to set to the high value the daisy-chain input of a subsequent slave device in the daisy-chain configuration.

5. The system according to claim 3, wherein the master device, in operation, assigns a respective dynamic address to each slave device from a list of available different dynamic addresses.

6. The system according to claim 1, wherein, during the address assignment procedure, the slave devices are assigned respective different provisional identification values based on the arrangement of the daisy-chain configuration, and the master device, in operation, assigns different dynamic addresses based on the different provisional identification values.

7. A digital communication system, comprising:
a master device; and a plurality of slave devices, which, in operation, are communicatively coupled with the master device over a shared data communication bus, the slave devices being coupled together in a daisy-chain configuration during an address assignment procedure, wherein each slave device has a daisy-chain input and a daisy-chain output, the daisy-chain input of a first slave device being coupled to a daisy-chain enabling output of the master device, the daisy-chain input of subsequent slave devices being coupled to the daisy-chain output of a previous slave device in the daisy-chain configuration, wherein the master device, in operation, assigns respective dynamic addresses to the slave devices based on an arrangement of the slave devices in the daisy-chain configuration, wherein, during the address assignment procedure, the slave devices are assigned respective different provisional identification values based on the arrangement of the daisy-chain configuration, and the master device, in operation, assigns different dynamic addresses based on the different provisional identification values, and wherein the slave devices have an internal counter incrementing cyclically and determining, at the end of the address assignment procedure, the respective provisional identification value; and wherein a high value of the daisy-chain input is designed to block the internal counter and is assigned cyclically to the slave devices in the daisy-chain configuration starting from the first slave device to the last slave device, with the remaining slave devices having a low value of the daisy-chain input, which is designed to enable the respective internal counter.

8. The system according to claim 7, wherein the master device, in operation, sets to the high value the daisy-chain input of the first slave device in an initial step of the address assignment procedure by driving the daisy-chain enabling output, and wherein the slave device having the high daisy-chain input, in operation, drives the respective daisy-chain output to a high level, so as to set to the high value the daisy-chain input of the subsequent slave device in the daisy-chain configuration.

9. The system according to claim 7, wherein the internal counter of the slave devices is designed to determine an instance ID part of the provisional identification value of the slave devices; and wherein the master device is configured to determine the respective different dynamic address based on the different provisional identification values with a ENTDAA command provided by an I3C protocol.

10. The system according to claim 1, wherein, according to the daisy-chain arrangement, the daisy-chain output of a last slave device is coupled to a daisy-chain feedback input of the master device; and wherein the master device, in operation, checks a value of the daisy-chain feedback input to determine if the dynamic addressing procedure is complete.

11. The system according to claim 10, wherein the master device, in operation, checks the value of the daisy-chain feedback input to verify that the dynamic addresses have correctly been assigned for all slave devices coupled to the shared data communication bus.

12. The system according to claim 1, wherein the assigned dynamic addresses provide location information of the slave devices, based on their arrangement in the daisy-chain configuration.

13. The system according to claim 1, wherein the shared data communications bus is a digital communication bus, which, in operation, operates according to an I3C protocol.

14. A method, comprising:
coupling a master device and a plurality of slave devices together over a shared communication bus;
coupling the plurality of slave devices together in a daisy-chain configuration, each slave device having a daisy-chain input and a daisy-chain output, the daisy-chain input of a first slave device of the plurality of slave devices being coupled to a daisy-chain enable output of the master device, and daisy-chain inputs of subsequent slave devices of the plurality of slave devices being coupled to a daisy-chain output of a previous slave device in the daisy-chain configuration; and
assigning, by the master device, respective dynamic addresses to the slave devices based on a position of the slave devices in the daisy-chain configuration, wherein the assigning respective dynamic addresses to the slave devices includes selectively disabling counters of slave devices of the plurality of slave devices.

15. The method according to claim 14, wherein the daisy-chain input is a static address set input of the slave devices, and the assigning, by the master device, of the respective dynamic addresses is based on the static addresses of the slave devices.

16. The method according to claim 14, comprising, assigning to the slave devices respective different provisional identification values based on positions of the slave devices in the daisy-chain configuration, wherein assigning, by the master device, of the respective dynamic addresses is based on the different provisional identification values of the slave devices.

17. A master device, comprising:
an interface, which, in operation, couples the master device to a plurality of slave devices via a communication bus, the plurality of slave devices being coupled together in a daisy-chain configuration;
a daisy-chain enable output, which, in operation, couples the master device to a daisy-chain input of a first slave device of the daisy-chain configuration;
a daisy-chain feedback input, which, in operation, couples the master device to a daisy chain output of a last slave device of the daisy chain configuration; and
control circuitry coupled to the interface, to the daisy-chain enable output, and to the daisy-chain feedback input, wherein the control circuitry, in operation, assigns respective dynamic addresses to the slave devices of the plurality of slave devices based on respective positions of the slave devices in the daisy-chain configuration, wherein the assigning respective dynamic addresses to the slave devices includes selectively disabling counters of slave devices of the plurality of slave devices.

18. The master device of claim 17, wherein:
the daisy-chain input of the first slave device is a static address set input of the first slave device, a daisy-chain input of a second slave device is a static address set input of the second slave device and is coupled to a daisy-chain output of the first slave device, and the assigning of the respective dynamic addresses is based on the static addresses of the slave devices.

19. The master device of claim 17, wherein the assigning respective dynamic addresses comprises:

assigning respective provisional identification values to the slave devices of the plurality of slave devices based on positions of the slave devices in the daisy-chain configuration; and assigning respective dynamic addresses based on the respective provisional identification values of the slave devices.

20. The master device of claim 19, wherein the assigning respective provisional identification values to the slave devices of the plurality of slave devices includes sequentially disabling counters of the plurality of slave devices.

21. The master device of claim 20, wherein the assigning respective dynamic addresses based on the respective provisional identification values of the slave devices includes assigning the respective dynamic addresses in response to an indication received via the daisy-chain feedback input that the assignment of the respective provisional identification values to the slave devices is complete.

22. The system of claim 1, wherein the selectively disabling counters of slave devices of the plurality of slave devices comprises sequentially disabling counters of slave devices of the plurality of slave devices.

23. The method of claim 14, wherein the selectively disabling counters of slave devices of the plurality of slave devices comprises sequentially disabling counters of slave devices of the plurality of slave devices.

* * * * *

UNITED STATES PATENT AND TRADEMARK OFFICE
CERTIFICATE OF CORRECTION

PATENT NO. : 11,847,079 B2
APPLICATION NO. : 17/714733
DATED : December 19, 2023
INVENTOR(S) : Eyuel Zewdu Teferi Page 1 of 1

It is certified that error appears in the above-identified patent and that said Letters Patent is hereby corrected as shown below:

On the Title Page

On page 2, Item (56) References Cited/Other Publications:
"5 NXP Semiconductors, "UM10204: I2C-bus specification and user manual," User Manual, Revision 6, Apr. 4, 2014, 64 pages."
Should read:
--NXP Semiconductors, "UM10204: I2C-bus specification and user manual," User Manual, Revision 6, Apr. 4, 2014, 64 pages.--.

In the Claims

Column 16, Line 2, Claim 13:
"communications"
Should read:
--communication--.

Column 16, Line 46, Claim 17:
"daisy chain"
Should read:
--daisy-chain--.

Column 16, Line 47, Claim 17:
"daisy chain"
Should read:
--daisy-chain--.

Signed and Sealed this
Twenty-third Day of April, 2024

Katherine Kelly Vidal
*Director of the United States Patent and Trademark Office*